United States Patent [19]
Nakamura

[11] Patent Number: 6,125,121
[45] Date of Patent: Sep. 26, 2000

[54] LAN INTERFACE DEVICE

[75] Inventor: Koichi Nakamura, Tokyo, Japan

[73] Assignee: NEC Corporation, Tokyo, Japan

[21] Appl. No.: 09/281,154

[22] Filed: Mar. 30, 1999

[30] Foreign Application Priority Data

Apr. 1, 1998 [JP] Japan ................................. 10-088980

[51] Int. Cl.$^7$ ................................................ H04L 12/66
[52] U.S. Cl. ............................................................ 370/463
[58] Field of Search ..................................... 370/274, 276, 370/282, 278, 293, 392, 395, 296, 463, 420, 520, 447

[56] References Cited

U.S. PATENT DOCUMENTS 5,247,540  9/1993  Hoge ........................................ 370/282
5,701,296  12/1997  Yamauchi ................................ 370/282

FOREIGN PATENT DOCUMENTS

| | | |
|---|---|---|
| 61-240352 | 10/1986 | Japan . |
| 61-263340 | 11/1986 | Japan . |
| 62-260443 | 11/1987 | Japan . |
| 1-286695 | 11/1989 | Japan . |
| 4-354224 | 12/1992 | Japan . |
| 7-38596 | 2/1995 | Japan . |
| 7-135510 | 5/1995 | Japan . |
| 8-46589 | 2/1996 | Japan . |

*Primary Examiner*—Joseph L. Felber
*Attorney, Agent, or Firm*—Ostrolenk, Faber, Gerb & Soffen, LLP

[57] ABSTRACT

A network interface device includes lines having functions for transmitting and receiving a signal to and from a station via a connection port. A line reversal circuit reverses the functions of the lines. A controller directs the line reversal circuit to switch the functions of the lines on non-reception of a predetermined signal which is tested for at predetermined intervals. The predetermined signal includes a connection confirmation signal, which is a Normal Link Pulse defined in the IEEE 802.3 Standard.

21 Claims, 3 Drawing Sheets

LAN INTERFACE DEVICE

FIELD OF THE INVENTION

The present invention relates to a LAN (Local Area Network) interface device, and in particular to a technique for transmitting and receiving a signal in a LAN.

This application is based on Japanese Patent Application No. Hei 10-088980, the contents of which are incorporated herein by reference.

BACKGROUND ART

In a conventional star-type LAN (Local Area Network) interconnecting stations and a multi-port repeater, each station is coupled to the multi-port repeater by a UTP straight cable and to the other stations by a UTP cross cable.

The conventional star-type LAN system, however, has the problem that the system requires use of the cable such that the functions of the lines of each station match those of another station. That is, the particular cable must be prepared depending on the type of the other station to be coupled. One of the known systems has a function of reversing the functions of the lines for transmitting and receiving signals, but must be manually operated, requiring inconvenient operation.

SUMMARY OF THE INVENTION

It is therefore an object of the present invention to provide a LAN interface device which eliminates use of a particular cable to configure the functions of the lines of the other station and the additional manual device for reversing the functions of the lines.

The present invention provides a method and apparatus which allows the stations to automatically detect the functions of the lines with which other stations can communicate, and allows the connected stations to set common functions for the lines.

In order to accomplish the above object, a network interface device having lines for transmitting and receiving a signal to and from a station via a connection port, comprises: a line reversal means for reversing the functions of the lines at predetermined intervals; and a controller for directing the line switcher to set the lines on reception of a predetermined signal.

According to the present invention, the functions of the lines are automatically determined to allow the stations to communicate. Therefore, the network can be connected irrespective of whether the cables are cross or straight type cables, and of the functions of the lines depending on the other device, such as a station device and a multi-port repeater.

In another aspect of the present invention, the predetermined signal includes a connection confirmation signal. The network interface device further comprises a wakeup signal generator for generating a wakeup signal to turn on the device. This allows the device to start based on the connection confirmation signal.

The connection confirmation signal is a Normal Link Pulse defined in the IEEE 802.3 Standard. The intervals at which the functions of the lines are reversed may be equal to or above 24 ms. The local area network which conforms to the IEEE 802.3 Standard can be easily connected to the stations having different line configurations.

The network interface device further comprises: an input/output bus for inputting and outputting data to and from the stations; and a network controller for transferring the input and output data to and from the local area network.

The method of the present invention for connecting stations using a local area network interface device having lines for transmitting and receiving a signal to and from a station via a connection port, comprises the steps of: reversing the functions of the lines at predetermined intervals; and setting the lines on reception of a predetermined signal.

In another aspect of the present invention, the predetermined signal includes a connection confirmation signal. The method further comprises the step of generating a wakeup signal to turn on the device. The connection confirmation signal is a Normal Link Pulse defined in the IEEE 802.3 Standard. In the step of reversing the functions of the lines at predetermined intervals, the intervals are equal to or above 24 ms. The method further comprises: inputting and outputting data to and from the stations; and transferring the input and output data to and from the local area network.

The computer readable medium of the present invention contains program instructions for connecting stations using a local area network interface device having lines for transmitting and receiving a signal to and from a station via a connection port, the program instructions including instructions for performing the steps comprising: reversing the functions of the lines at predetermined intervals; and setting the lines on reception of a predetermined signal.

In another aspect of the present invention, the predetermined signal includes a connection confirmation signal. The program instructions may include instructions for performing the step of generating a wakeup signal to turn on the device. The connection confirmation signal is a Normal Link Pulse defined in the IEEE 802.3 Standard. In the step of reversing the functions of the lines at predetermined intervals, the intervals are equal to or above 24 ms. The program instructions include instructions for performing the step of inputting and outputting data to and from the stations; and transferring the input and output data to and from the local area network:

DETAILED DESCRIPTION OF THE PREFERRED EMBODIMENTS

Figure 1:
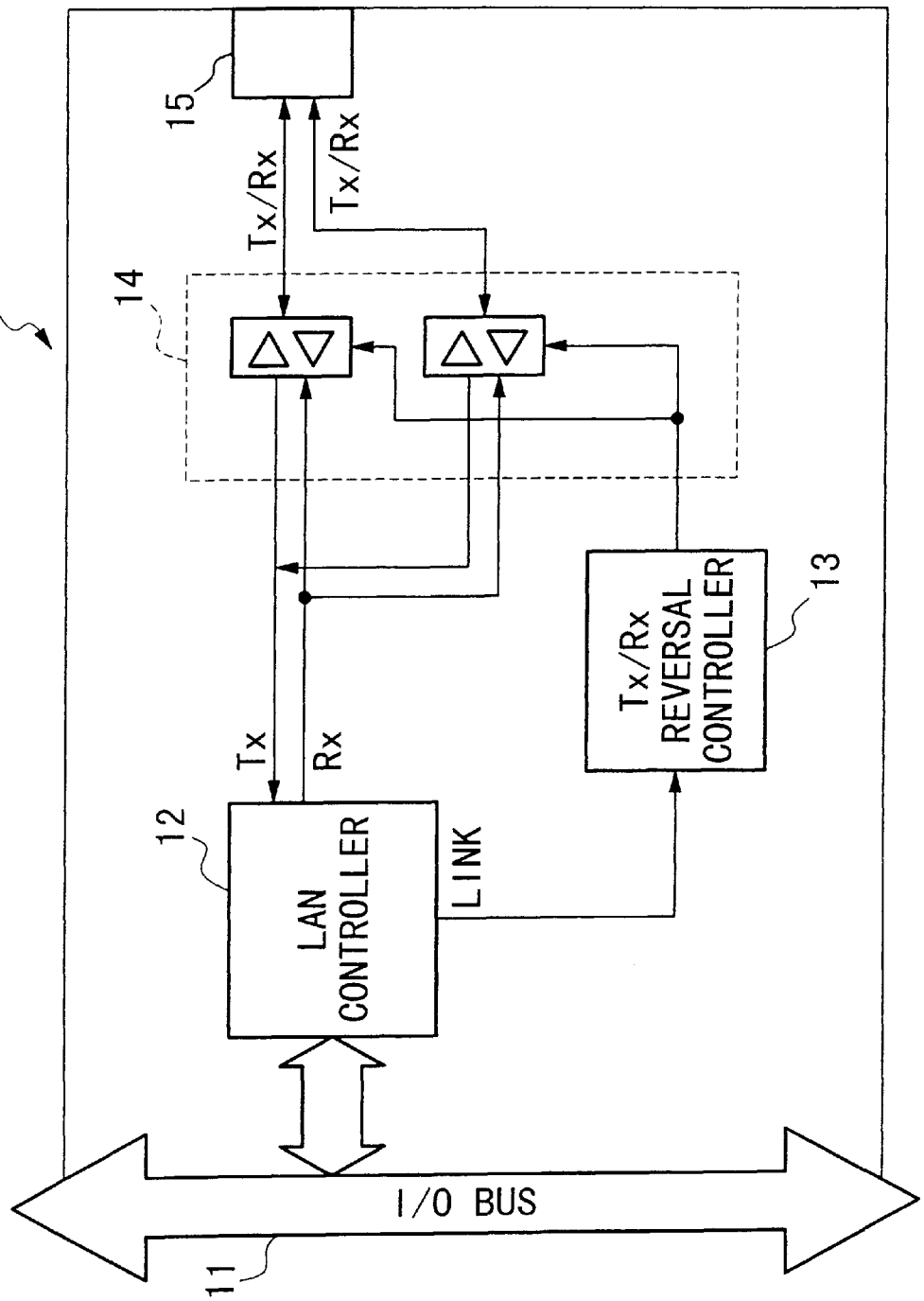
FIG. 1 is a block diagram showing a first embodiment of the structure of the local area network interface device of the present invention.
Figure 2:
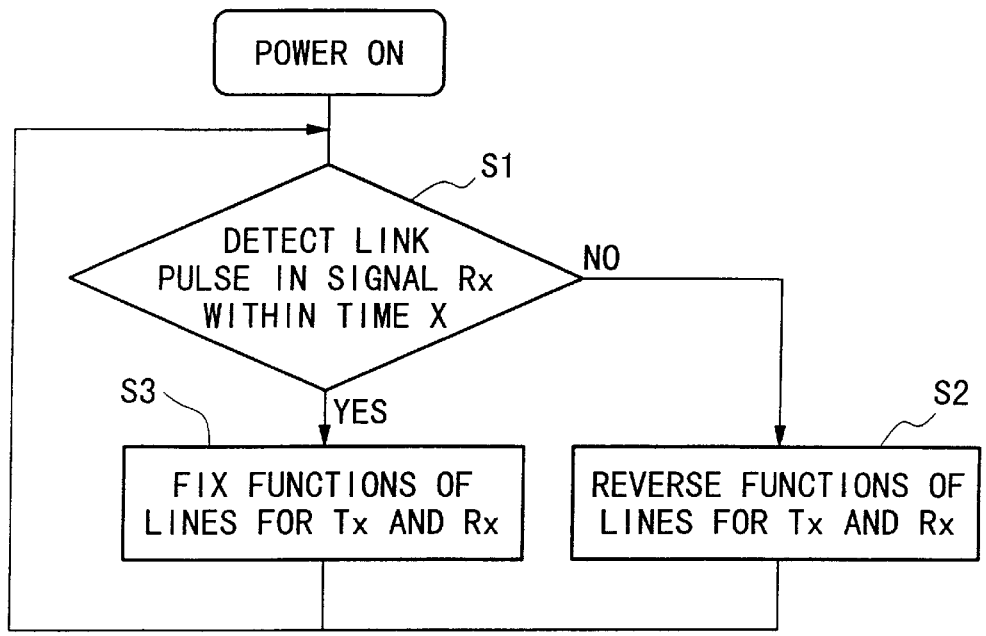
FIG. 2 is a flow chart showing the process of the local area network interface device of the present invention.
Figure 3:
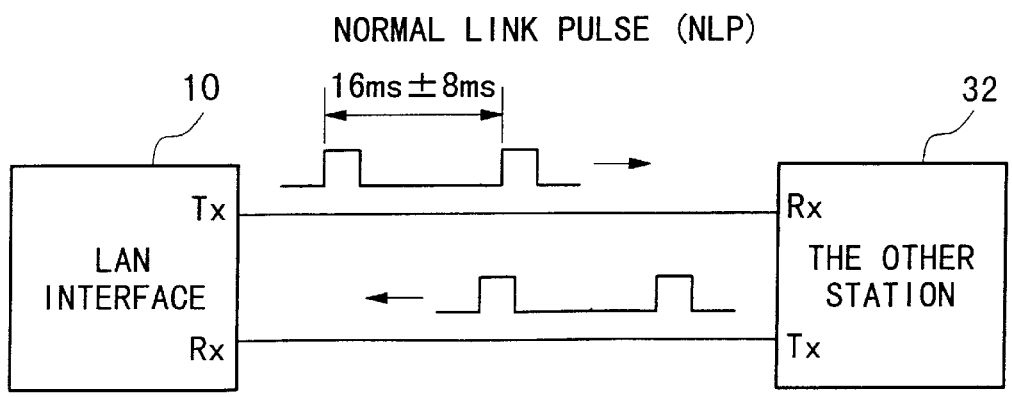
FIG. 3 is a diagram showing a process for sending a Normal Link Pulse defined in the IEEE 802.3 standard.

Referring to FIGS. 1 to 3, the best mode of the LAN interface device, according to an embodiment of the present invention, will be explained. The embodiment includes information processing stations (terminals) in a local area network which conform to the 10BASE-T standard and the 100BASE-T standard in the IEEE 802.3 Standard.

Referring to FIG. 1, the LAN interface device 10 comprises an I/O bus 11 for inputting and outputting data to and from the stations; a LAN controller 12 for transferring the input and output data to and from the LAN; a Tx/Rx reversal controller 13 for controlling reversal of functions of lines for transmitting and receiving signals Tx and Rx based on a link pulse detection signal LINK detected by the LAN controller 12; a Tx/Rx controller circuit (line reversal means) 14 for reversing the functions of the lines based on the instruction from the Tx/Rx switching controller 13; and a connection port 15 for establishing connection with the other device.

FIGS. 2 and 3 show communication using the LAN interface device 10. FIG. 3 shows an operation of sending a Normal Link Pulse defined in the IEEE 802.3 Standard.

The Normal Link Pulse is sent and received between the stations having the LAN interface to confirm the establishment of the connection. That is, the Normal Link Pulse is applied on a network link segment to assist stations connected to the segment in determining the segment's integrity. Such a Link Pulse scheme is known in the art.

In the star-type LAN, the device, which includes the LAN interface 10, sends and receives the link pulse signal to and from the other station 32 (for example, a concentrator such as a multi-repeater) and determines, by detecting the link pulse signal, that the physical connection is established.

The determination of the establishment of the physical connection is made when the link pulse signal sent from the other station is found in the received signal Rx. The device detects the link pulse signal only when the functions of the lines of the device match those of the other station, and a straight or cross type cable is appropriately selected.

When the power supply is turned on, the LAN interface device 10 starts detecting the link pulse signal in the received signal Rx using the LAN controller 12 (in step S1). The Tx/Rx reversal controller 13 monitors the signal LINK output from the LAN controller 12 for a time x sufficient to detect the link pulse signal, which is more than 16+8=24 ms, and is 25 ms in this embodiment because the Normal Link Pulses are transmitted every 16 ms±8 ms while the network link segment is active.

When no link pulse signal is detected in the received signal Rx, the signal LINK is not valid, and then the LAN controller 12 determines that no other station has entered the network. As the result, the Tx/Rx reversal controller 13 directs the Tx/Rx controller circuit 14 to reverse the functions of the lines for transmitting the signal Tx and receiving the signal Rx (in step S2).

Subsequently, the Tx/Rx controller 12 continues monitoring the signal LINK output from the LAN controller 12 for 25 ms, and repeats reversal of the functions of the lines for transmitting the signal Tx and receiving the signal Rx at intervals of 25 ms until the link pulse signal is detected, that is, until the signal LINK output from the LAN controller 12 becomes valid.

When the other station is coupled to the connection port 15 through the cable, the LAN controller 12 detects the link pulse signal in the above link pulse signal detection cycle, at which point the signal LINK becomes valid. Then, the Tx/Rx switching controller 13 sets the functions of the lines for transmitting the signal Tx and receiving the signal Rx to establish the physical connection (in step S3), and maintains them until the link pulse signal is not detected.

Figure 4:
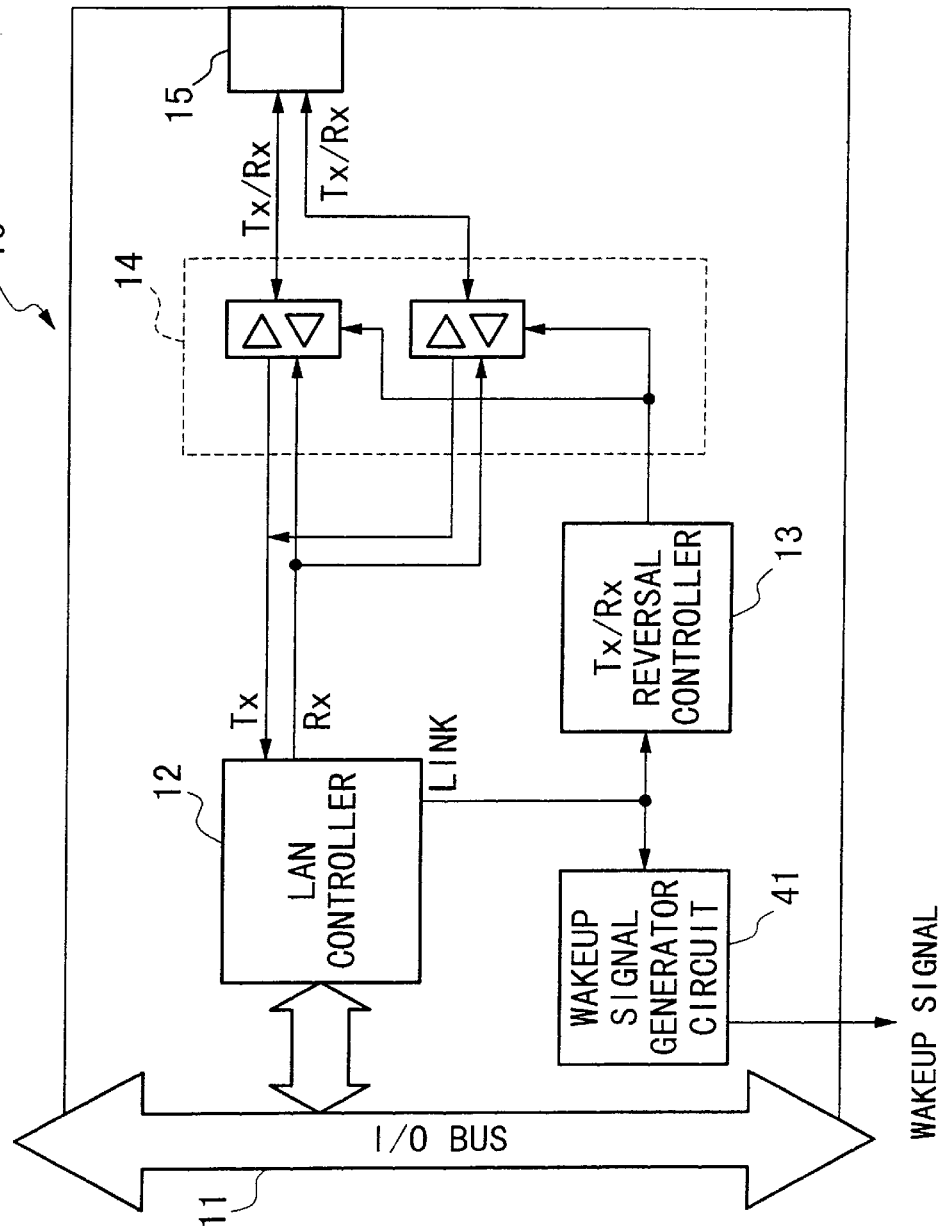
FIG. 4 is a block diagram showing a second embodiment of the structure of the local area network interface device of the present invention.

Another embodiment of the present invention will be explained with reference to the block diagram of FIG. 4, in which the same reference numbers designate the same parts as in FIG. 1, and only the difference will be discussed.

The LAN interface device 10' of the embodiment further comprises a wakeup signal generator circuit 41 in addition to the configuration of the LAN interface device 10. The wakeup signal generator circuit 41 generates a wakeup signal in response to the link pulse detection signal LINK.

The wakeup signal triggers the power supply for turning on the device, eliminating a manual operation such as pushing a power supply switch. The wakeup signal is a pulse signal with a predetermined period or a flat signal, which is output when the link pulse signal LINK becomes valid. On reception of the wakeup signal, the station device is automatically turned on at the edge of the pulse or according to the level of the flat signal.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A network interface device in a local area network including lines having functions of transmitting and receiving a signal to and from a station via a connection port respectively, said network interface device comprising:

a line reversal circuit which reverses the functions of the lines; and a LAN controller which tests for receipt of a predetermined signal and directs the line reversal circuit, to switch the function of the lines based upon non-receipt of the predetermined signal.

2. A network interface device according to claim 1, wherein the predetermined signal includes a connection confirmation signal.

3. A network interface device according to claim 2, wherein the connection confirmation signal is a normal link pulse defined in the IEEE 802.3 standard.

4. A network interface device according to claim 1, further comprising a wakeup signal generator which generates a wakeup signal to turn on the device.

5. A network interface device according to claim 1, further comprising:

an input/output device bus which inputs and outputs data to and from the station; and wherein the LAN controller transfers the input and output data to and from the local area network.

6. The network interface device as claimed in claim 1, wherein the controller tests for the receipt at predetermined intervals.

7. The network interface device as claimed in claim 6, wherein the predetermined intervals are each at least 24 ms long.

8. A method for connecting stations in a local area network using a local area network interface device, the interface device including lines having functions of transmitting and receiving a signal to and from a station via a connection port respectively, the method comprising the steps of:

testing for a predetermined signal; and reversing the functions of the lines based upon non-receipt of the predetermined signal.

9. A method according to claim 8, wherein the predetermined signal includes a connection confirmation signal.

10. A method according to claim 9, wherein the connection confirmation signal is a normal link pulse defined in the IEEE 802.3 standard.

11. A method according to claim 8, further comprising the step of generating a wakeup signal to turn on the device.

12. A method according to claim 8, further comprising:

inputting and outputting data to and from the station; and transferring the input and output data to and from the local area network.

13. The method as claimed in claim 8, wherein the testing is performed at predetermined intervals.

14. The method as claimed in claim 13, wherein the predetermined intervals are each at least 24 ms long.

15. A computer readable medium containing program instructions for connecting stations in a local area network using a local area network interface device, the interface device including lines having functions of transmitting and receiving a signal to and from a station via a connection port respectively, the program instructions including instructions for:

testing for a predetermined signal; and reversing the functions of the lines based upon non-receipt of the predetermined signal.

16. A computer readable medium according to claim 13, wherein the predetermined signal includes a connection confirmation signal.

17. A computer readable medium according to claim 14, wherein the connection confirmation signal is a normal link pulse defined in the IEEE 802.3 standard.

18. A computer readable medium according to claim 15, wherein the program instructions include instructions for generating a wakeup signal to turn on the device.

19. A computer readable medium according to claim 15, wherein the program instructions include instructions for performing the steps of:

inputting and outputting data to and from the station; and transferring the input and output data to and from the local area network.

20. The computer readable medium as claimed in claim 13, wherein the testing is performed at predetermined intervals.

21. The computer readable medium as claimed in claim 20, wherein the predetermined intervals are each at least 24 ms long.

\* \* \* \* \*